United States Patent
Zimmermann

(10) Patent No.: US 10,126,443 B2
(45) Date of Patent: Nov. 13, 2018

(54) ACTIVE MICROPHONIC NOISE CANCELLATION IN RADIATION DETECTORS

(71) Applicant: Sergio Zimmermann, Pleasant Hill, CA (US)

(72) Inventor: Sergio Zimmermann, Pleasant Hill, CA (US)

(73) Assignee: The Regents of the University of California, Oakland, CA (US)

( * ) Notice: Subject to any disclaimer, the term of this patent is extended or adjusted under 35 U.S.C. 154(b) by 207 days.

(21) Appl. No.: 14/948,043

(22) Filed: Nov. 20, 2015

(65) Prior Publication Data

US 2016/0077225 A1    Mar. 17, 2016

Related U.S. Application Data

(63) Continuation of application No. PCT/US2014/044537, filed on Jun. 27, 2014.

(60) Provisional application No. 61/840,062, filed on Jun. 27, 2013.

(51) Int. Cl.
   *G01T 7/00* (2006.01)
   *G01H 17/00* (2006.01)
   *G01T 1/24* (2006.01)

(52) U.S. Cl.
   CPC ............ *G01T 7/005* (2013.01); *G01H 17/00* (2013.01); *G01T 1/244* (2013.01)

(58) Field of Classification Search
   CPC .......... G01T 7/005; G01T 1/244; G01T 1/24; G01T 1/16; G01T 1/2928; G01N 17/00; H04N 5/374; G01J 5/0022; G01J 5/026; G01H 17/00
   See application file for complete search history.

(56) References Cited

U.S. PATENT DOCUMENTS

| | | | |
|---|---|---|---|
| 4,224,521 A | 9/1980 | Fisher | |
| 5,388,080 A * | 2/1995 | Feintuch | G10K 11/178 367/135 |
| 5,689,572 A | 11/1997 | Ohki et al. | |
| 6,453,008 B1 | 9/2002 | Sakaguchi et al. | |
| 2007/0205372 A1 | 9/2007 | Pauly et al. | |
| 2008/0306705 A1 * | 12/2008 | Luo | B61K 9/04 702/134 |

(Continued)

OTHER PUBLICATIONS

Widrow et al. ("Adaptive Noise Cancelling: Principles and Applications", Proceedings of the IEEE, vol. 63, No. 12, Dec. 1975 (Dec. 12, 1975), pp. 1692-1716).*

(Continued)

*Primary Examiner* — Que T Le
*Assistant Examiner* — Jennifer Bennett

(57) ABSTRACT

A new adaptive filtering technique to reduce microphonic noise in radiation detectors is presented. The technique is based on system identification that actively cancels the microphonic noise. A sensor is used to measures mechanical disturbances that cause vibration on the detector assembly, and the digital adaptive filtering estimates the impact of these disturbances on the microphonic noise. The noise then can be subtracted from the actual detector measurement. In this paper the technique is presented and simulations are used to support this approach.

2 Claims, 7 Drawing Sheets

(56) References Cited

U.S. PATENT DOCUMENTS

2010/0094147 A1* 4/2010 Inan .................. A61B 5/029
                                                      600/500
2011/0147597 A1  6/2011 Nelson et al.

OTHER PUBLICATIONS

Zimmermann, "Active microphonic noise cancellation in radiation detectors." Nuclear Instruments and Methods in Physics Research Section A: Accelerators, Spectrometers, Detectors and Associated Equipment, vol. 729, pp. 404-409, 2013.

Gatti et. al., "Adaptive system for microphonic noise suppression in microcalorimetric detector signal." Nuclear Instruments and Methods in Physics Research Section A: Accelerators, Spectrometers, Detectors and Associated Equipment, vol. 368, No. 3, pp. 765-769, 1996.

Fontanelli et al., "An adaptive system for the reduction of the microphonic noise in cryogenic detectors signal." Nuclear Instruments and Methods in Physics Research Section A: Accelerators, Spectrometers, Detectors and Associated Equipment, vol. 370, pp. 218-219, 1996.

Schultz et. al., "Improvement of spectral resolution in the presence of periodic noise and microphonics for hyper-pure germanium detector gamma-ray spectrometry using a new digital filter." Journal of Radioanalytical and Nuclear chemistry, vol. 271, No. 1, pp. 101-106, Jan. 2007.

Morales et. al., "Filtering microphonics in dark matter germanium experiments." Nuclear Instruments and Methods in Physics Research Section A: Accelerators, Spectrometers, Detectors and Associated Equipment, vol. 321, No. 1-2, pp. 410-414, Sep. 15, 1992.

Uritani et. al., "Reduction of microphonic noise by digital waveform processing." Nuclear Instruments and Methods in Physics Research Section A: Accelerators, Spectrometers, Detectors and Associated Equipment, vol. 351, No. 2-3, pp. 598-599, Dec. 1, 1994.

Johnson et. al., "Embedded Active Vibration Cancellation of a Piston-Driven Cryocooler for Nuclear Spectroscopy Applications." Topics in Modal Analysis I, vol. 5, Conference Proceedings of the Society for Experimental Mechanics Series 30, pp. 377-384, 2012.

International Search Report and Written Opinion for International Application No. PCT/US14/44537 dated Apr. 2, 2015.

Widrow et. al., "Adaptive Noise Cancelling: Principles and Applications." Proceedings of the IEEE, vol. 63, No. 12, pp. 1692-1716, Dec. 1975.

* cited by examiner

ACTIVE MICROPHONIC NOISE CANCELLATION IN RADIATION DETECTORS

CROSS REFERENCE TO RELATED APPLICATIONS

This U.S. application is a Continuation of PCT Application PCT/US2014/044537 filed Jun. 27, 2014, which claims priority to U.S. Provisional Application Ser. No. 61/840,062 filed Jun. 27, 2013, which application is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

Field of the Invention

This invention relates generally to active microphonic noise cancellation.

Brief Description of the Related Art

Development of digital electronics, system identification and adaptive filtering techniques are allowing new approaches to improve the performance of radiation detectors. Powerful and affordable field programmable gate arrays (FPGAs), as well as high rate and resolution analog-to-digital converters are allowing cost effective digital processing algorithms specially designed for nuclear instrumentation. In this paper we are proposing an approach to reduce the microphonic noise and improve energy, timing, position and tracking resolution of radiation detectors.

Microphonic noise in radiation detectors is associated with mechanical disturbances. These disturbances interact with the structure of the detector enclosure and its components, exciting mechanical vibrations. In one of the processes responsible for this noise, vibrations in the structure change capacitances inside the detector enclosure, injecting charge into the detector itself or its cables. This charge adds to the detector output and is measured as microphonic noise, degrading its performance.

There are several sources for these mechanical disturbances. We will now describe a few examples. Vacuum pumps can be installed in the proximity of the detector, causing vibrations that are transmitted to the detector enclosure. In general, high resolution experiments require detectors operating at cryogenic temperatures to reduce leakage current. These temperatures can be achieved using piston driven cryocoolers mounted as part of the detector assembly (e.g., for portable radiation detector systems). The electrical motor and piston of the cryocooler generate vibrations that propagate to the detector enclosure. Other systems use cryostats with detectors cooled by Dewars mounted as part of the cryostat and with an external source of liquid nitrogen. The nitrogen "bubbling" inside the Dewar may cause vibrations. Even audible noise in the environment close to the detector may interfere with the detector enclosure. Therefore, microphonic noise is difficult to control and mitigate.

Conventional filtering in nuclear spectroscopy is based on pulse shaping, substantially reducing the impact of microphonic noise (as well as other noise sources). However, if the mechanical resonant frequencies have components similar to the actual frequencies of the detector pulse, the shaper may allow the noise to propagate to the multichannel analyzer, degrading the energy resolution.

The impact of microphonic noise can be more severe in multisegmented detectors, where the actual shape and amplitude of the detector pulse waveforms are used to estimate the interaction point and tracking of the gamma rays within the detector volume. Since information is contained on the shape and amplitude of the pulses themselves, there are fewer opportunities to filter the noise in these signals because traditional shaper filters cannot be used.

The literature describes several approaches to reduce microphonic noise in high energy resolution radiation detectors. They are used mostly in nuclear spectroscopy. Various references propose an adaptive filter that uses a priori information about the exact form of the pulse signal after the charge sensitive amplifier, adapting a shaper to attenuate the microphonic noise deviating from this form. Other solutions deal with low-frequency periodic noise induced by mechanically cooling devices (e.g., cryocoolers). For example, variations on the shaper amplifier are used to minimize these contributions and another reference proposes a counterweight to mechanically minimize these system disturbances. However, observe that these approaches focus on improving the energy resolution by implementing enhanced shaper amplifiers, but they do not address microphonic noise in the detector output waveforms, which impact timing, position and tracking resolution.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings.

Various embodiments of the invention describe a filtering technique based on system identification and adaptive signal processing. A sensor (e.g., accelerometer, voltage detector, motion detector) measures the mechanical disturbances on the detector structure. System identification techniques estimate a model of the electro/mechanical system injecting microphonic noise by monitoring the vibrations and the detector output. As the estimated model converges, the microphonic noise is more precisely attenuated and, thus, increasing the energy, timing, position and tracking resolution of the system. Furthermore, temporal variations on the coupling of the mechanical disturbances into microphonic noise can be tracked and minimized.

Active Microphonic Noise Cancellation

Figure 1:
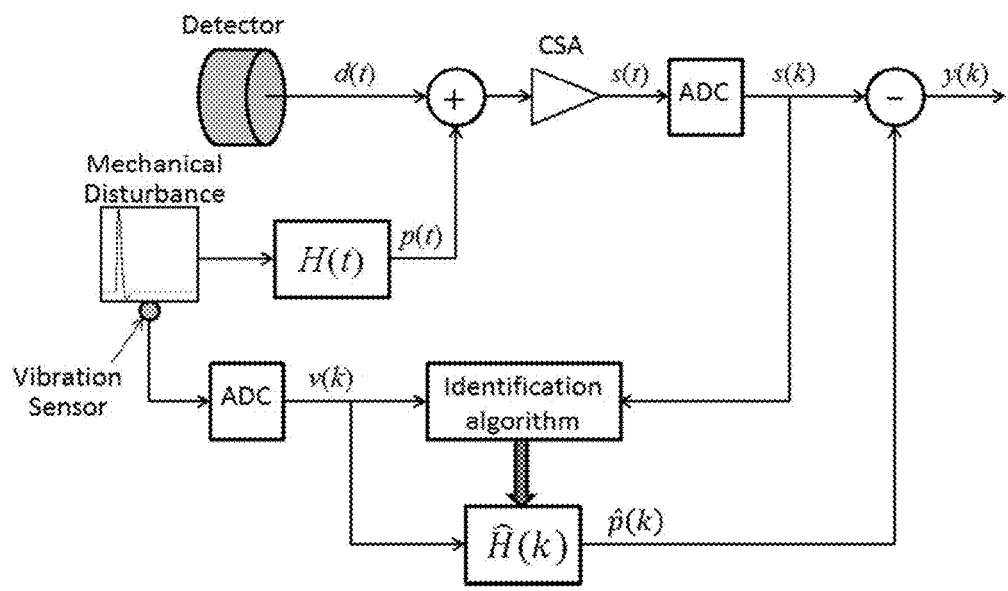
FIG. 1 illustrates a block diagram of a scheme for active microphonic noise cancellation.

FIG. 1 shows the block diagram of the proposed scheme. In this diagram, we highlight that the microphonic noise p(t) is added to the detector signal d(t) and then amplified by the charge sensitive amplifier (CSA). The variable t is used to highlight that this portion of the circuit is on the continuous time domain. The CSA output s(t) is converted to digital by a sample and hold and analog to digital converter (ADC) circuit, generating s(k):

$$s(k)=r(k)+n(k)+p(k), \quad (1)$$

where r(k) is the charge deposited by the radiation, n(k) is the noise associated with the detector, amplifier, ADC and other components and k is the sample number in the discrete time domain. Of course, in a real system, the signal from the detector already contains the microphonics noise. Here, we are explicitly separating it from the detector signal for explanation purpose.

In the block diagram, we assume that some mechanical disturbance cause vibrations that convolves with an electro/mechanical system H(t) generating the microphonics noise p(t). In the introduction, we illustrated a few examples of how these mechanical disturbances could be generated. Consider the case of a vacuum pump operating close to the detector. The pump vibrations are transmitted to the detector structure, and the structure itself then oscillates with its own resonant frequencies and damp factors and injects charge noise into the detector signal d(t). The system H(t) captures the electro/mechanical process by which these disturbances are coupled to the detector signal.

In one embodiment, we measure the mechanical disturbance using some sensor (e.g., accelerometer). We intend to investigate options associated with possible location of this sensor, its sensitivity and implications on performance of the proposed scheme. This sensor is instrumented by its own ADC generating v(k).

The objective now is to estimate the system H(t) using an identification algorithm that monitors the mechanical disturbances and the microphonic noise contained in the detector signal s(k). The identification algorithm adjusts the parameters of the system Ĥ(k) by internally minimizing the error between the estimated microphonic noise p̂(k) and the measured p(k). The output y(k) is given by $$y(k)=s(k)-\hat{p}(k)=r(k)+n(k)+p(k)-\hat{p}(k). \quad (2)$$

Therefore, as Ĥ→H, so does p̂(k)→p(k), and the microphonic noise in the output y(k) decreases. Observe that the identification of system H(t) does not need to be perfect to obtain reasonable noise minimization. The uncancelled portion can be small when compared with the remaining noise n(k). The output y(k), instead of s(k), is now used by the rest of the system for further processing.

The literature describes several approaches for system identification with different performance characteristics and number of parameters to estimate. Here is the example of a few. Some of these methods are recursive and guarantee convergence to a global optimum solution based on relatively easy to obtain conditions.

Examples of such methods include linear-in-the-parameters strategies, like the least mean square (LMS) algorithm adjusting finite impulse response (FIR) filters. Fixing poles in specific positions allow the use of infinite impulse response filters, which are more compact while still keeping the linear-in-the-parameters characteristics. Other algorithms are based on data block processing: first acquire a block of data and use it to estimate the optimum parameters at some specific time.

An embodiment models the coupling of these disturbances to the microphonic noise using the transfer function H(t). We are assuming we can model H(t) using linear systems. However, observe that the need for linearity is associated with the connection between the mechanical disturbance and the microphonic noise; it is not associated with the process that causes the disturbance themselves. For example, references describe the complex dissipative process in dilution cryostats that generates vibrations on the detector structure. Since we are measuring the vibration, the process that generates these disturbances does not need to be modeled. Another aspect is that this coupling can be time varying, i.e. H(t) may change as time progresses. This can be addressed by an identification algorithm that tracks the changes.

Simulations

Various embodiments used simulations to demonstrate the feasibility of the proposed scheme. We will now describe how they were performed and their results. Our simulations were based on the information described in Table 1. Specifically for energy resolution with microphonic noise we assumed a substantial degradation to illustrate the performance of the proposed scheme.

TABLE 1

Parameters used for simulations

| Parameter | Setup | Unit |
|---|---|---|
| Detector ADC sampling frequency | 10 | ns |
| Trapezoidal filter configuration | | |
| Collection time | 4 | µs |
| Integration time | 320 | ns |
| Time constant of the CSA with resistive feedback and pole/zero compensation | 50 | µs |
| Segment resolution for $^{60}$Co sources (FWHM) | | |
| Without microphonic noise | ~2.4 | KeV FWHM |
| With microphonic noise | ~3.3 | KeV FWHM |
| ADC output for the $^{60}$Co lines: | | |
| 1.17 MeV | 940 | Counts |
| 1.33 MeV | 1060 | Counts |

Figure 2:
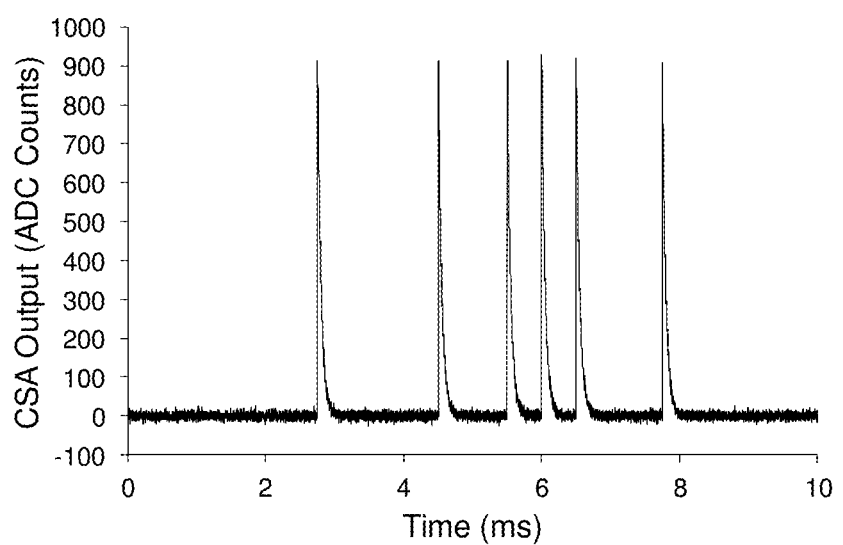
FIG. 2 illustrates an example of the digitized output s(k) of the charge sensitive amplifier without microphonic noise.
Figure 3:
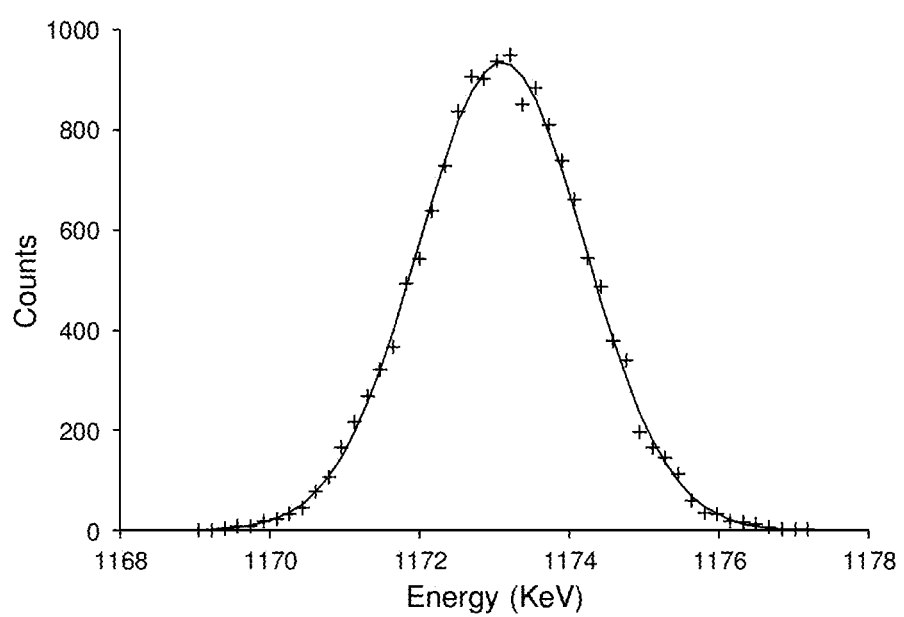
FIG. 3 illustrates an energy histogram for the 1.17 MeV line without microphonic noise: crosses are the energy histogram, line is the Gaussian fit.

The radiation detected r(t) was generated using a Poisson distribution in time with an average rate of 400 Hz. This decreases the possibility of pile-up and avoids simulation of an additional pole-zero correction. Just the two $^{60}$Co lines were used. Initially, the microphonic noise p(t) is set to zero. The detector noise n(t) was simulated using white noise. The amplitude was set such that we obtain an energy resolution of approximately 2.4 KeV FWHM after a trapezoidal filter with collection and integration time described in Table 1. FIG. 2 shows an example of the digitized output of the CSA s(k) for such scenario. FIG. 3 shows the energy histogram for the 1.17 MeV line. The crosses are part of the energy histogram, and the line is the Gaussian fit.

We now add microphonic noise p(t) to the detector. For our simulations we will use two types of mechanical disturbances. The first one is white noise band-limited by a 6-poles Butterworth low pass filter with a 3 dB 20 KHz cutoff frequency. The low pass filter represents a mechanical vibration with limited bandwidth. This disturbance, for example, could simulate the "bubbling" of the liquid nitrogen inside the Dewar. The second disturbance used in the simulations is periodic, with a fixed 1 KHz rate. This could represent, for example, the mechanical vibration of a cryocooler coupling to the detector enclosure.

Figure 4A:
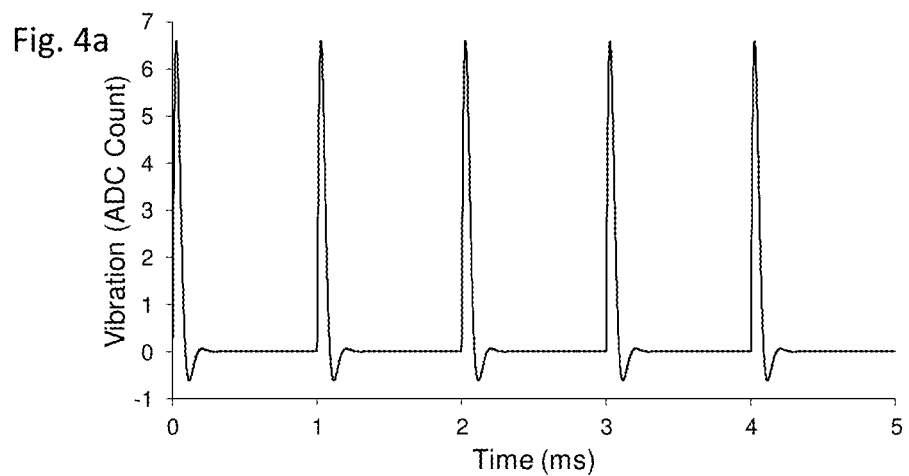
FIG. 4a illustrates simulated periodic mechanical disturbance v(k), FIG. 4b its impact on the microphonic noise p(k) and FIG. 4c the digitized output of the CSA s(k) with added microphonic noise for these conditions.
Figure 4B:
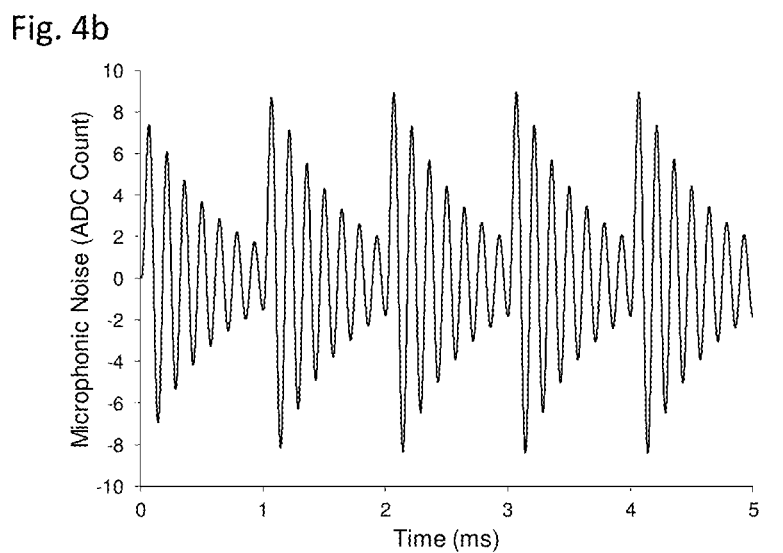
Figure 4C:
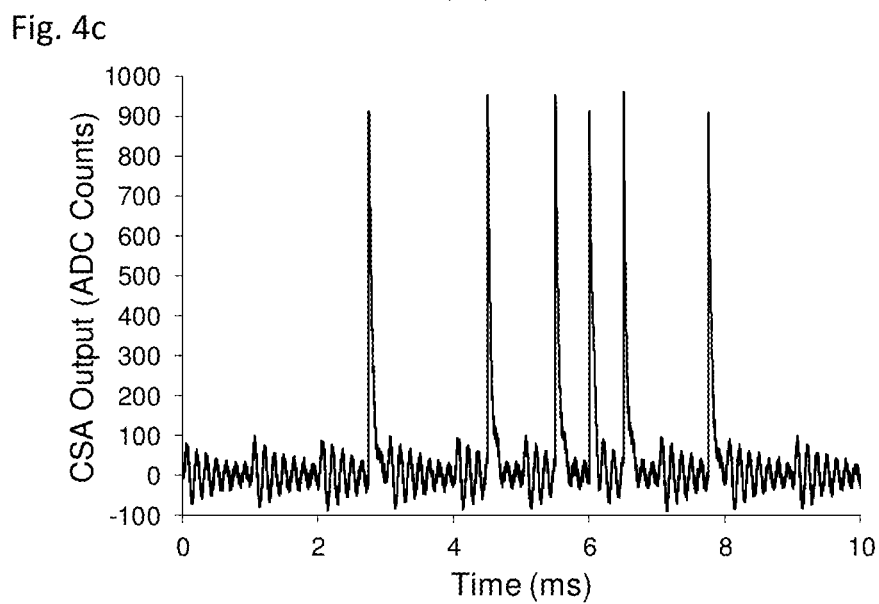

In our simulations, H(t) is a second order transfer function representing a spring-mass system with friction and 7 KHz natural oscillating frequency. The amplitude of the disturbances, both band-limited white noise and periodic, are adjusted to degrade the energy resolution to approximately 3.35 KeV FWHM. For illustration, FIG. 4 (a) shows the simulated periodic disturbance v(k), FIG. 4 (b) its impact on the microphonic noise p(k) and FIG. 4 (c) the digitized output of the CSA s(k) with added microphonic noise for these conditions. The amplitude of both disturbances were set such that the estimated energy resolution degrades to approximately 3.35 KeV FWHM when using the same trapezoidal filter configuration as before.

We will now describe the details of the simulations used to cancel the microphonic noise. We selected a sampling frequency of 5 μs for the ADC connected to the vibration sensor (refer to FIG. 1), which is enough to capture all information contained in the sensor output. When we refer to the 5 μs sampling time we will use variable q. The signal s(k) is decimated by a factor of 500 to match the sampling frequency of the mechanical disturbance (i.e., from 10 ns to 5 μs) and we use an FIR filter $$\hat{H}(z) = \hat{h}_0 + \hat{h}_{-1}z^{-1} + \ldots + \hat{h}_{-(j+1)}z^{-(j+1)} \quad (3)$$

to represent $\hat{H}(k)$, where j=200 adjustable parameters and z refers to the z-transform.

For simplicity, FIG. 1 does not show the decimation on s(k) and we assume it is part of the identification algorithm block. The identification algorithm we used to test is the recursive LMS, due to its simplicity, easy implementation and linear-in-the-parameter characteristic (i.e., adapts to a global minimum given the persistent excitation condition). Of course, as pointed before, the literature describes several identification algorithms with different performances. In this invention we are not looking for the most suitable algorithm for such application, but rather on demonstrating the usefulness of the proposed microphonic noise cancellation scheme. We will now describe the LMS algorithm used for both disturbances. Define the vector $$\hat{H}(q) = [\hat{h}_0(q)\hat{h}_{-1}(q) \ldots \hat{h}_{-(j+1)}(q)]^T \quad (4)$$

formed by the adjustable parameter of the finite impulse response (FIR) filter (capital letters in the equations are used to identify vectors). Also, construct the vector $$V(q) = [v(q)v(q-1) \ldots v(q-j+1)]^T \quad (5)$$

where v(i) is time delayed samples of the vibration sensor and initialize $\hat{H}(q)=0$. The recursive algorithm starts here. First find the estimated output $$\hat{p}(q) = \hat{H}^T(q) \cdot V(q). \quad (6)$$

Then the error e(q) between the measured signal and the estimated output of the adaptive filter $$e(q) = s(q) - \hat{p}(q). \quad (7)$$

Finally, update the parameters of the FIR filter $$\hat{H}(q+1) = \hat{H}(q) + \mu V(q)e(q), \quad (8)$$

where μ is small and positive number. Repeat the algorithm. The parameter μ has to be adjusted to avoid divergence of $\hat{H}(q)$. A variation of the LMS algorithm is the normalized LMS, which uses the input V(q) to weight on μ, making it a more robust algorithm.

During the simulations, we observed that when radiation is detected, the signal r(k) was capable of disrupting the adaptive algorithm quite substantially. This can be understood observing the LMS algorithm. In our simulations, when radiation is detected, s(k) is substantially larger then p(k), and the error e(k) is large. Then, the recursive process (Eq. 2) significantly upgrades the parameters of $\hat{H}(q)$, but in the wrong direction. To handle this effect, we changed the algorithm to turn off the adaptation while s(k) is above the threshold of 150 ADC counts.

Figure 5A:
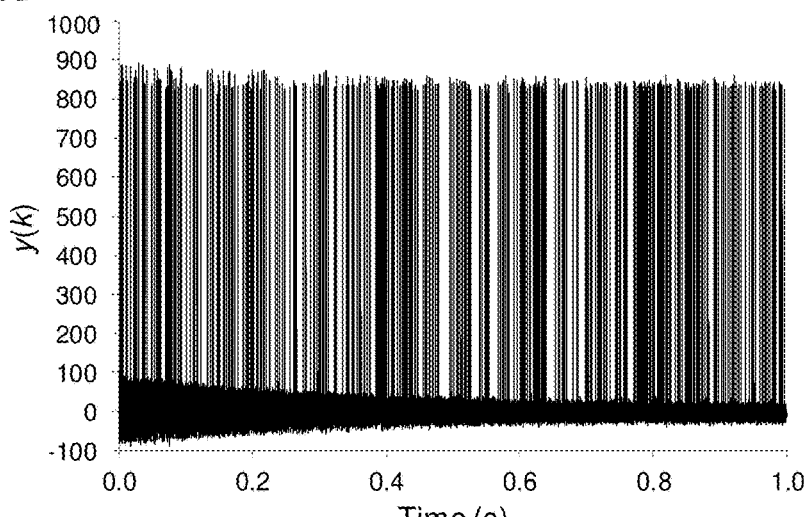
FIG. 5a illustrates Microphonic noise cancellation y(k) as the LMS algorithm adapts, FIG. 5b detail of the microphonic noise early in the adaption process, and FIG. 5c after the parameters already adapted.
Figure 5B:
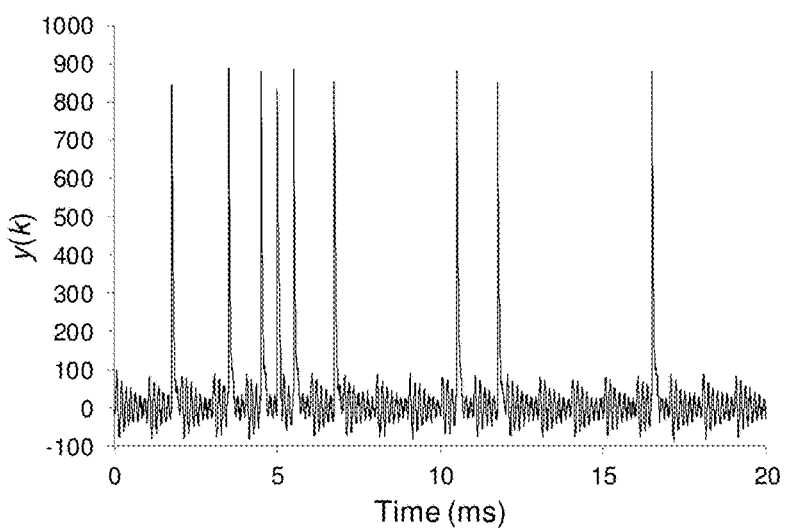
Figure 5C:
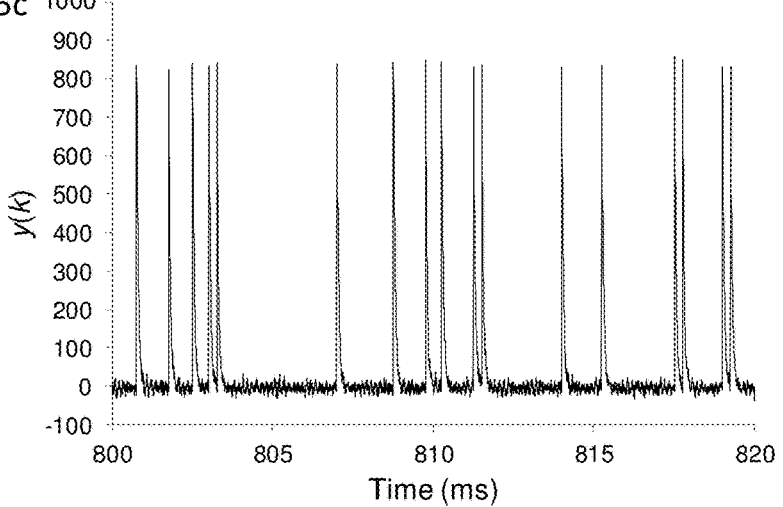

To generate now $\hat{p}(k)$ (i.e., in the 10 ns sampling time), we up-sampled the output $\hat{p}(q)$ (the opposite operation of decimation) to 10 ns and interpolate the signal using a low pass filter. Again, for simplicity this process is not shown in FIG. 1 and is considered as part of the block $\hat{H}(k)$. We can now subtract $\hat{p}(k)$ from s(k) to cancel the microphonic noise (Eq. 2). FIG. 5(a) shows the LMS algorithm adapting $\hat{H}(k)$. Observe that at the beginning, the parameters of the FIR filter are mostly very close to zero due to the initialization $\hat{H}(q)=0$, and there is almost no cancellation of the microphonic noise (FIG. 5(b)). As time progresses, the algorithm more precisely models H(t) and the noise decreases (FIG. 5(c)).

With the adaptive cancellation running, we now estimate the energy resolution of y(k) using the same trapezoidal filter as before and for both disturbances. For the 1.17 KeV line, the energy resolution is now 2.42 KeV for the band-limited white noise disturbance and 2.46 KeV for the periodic disturbance. The proposed scheme mostly recovers the original energy resolution before microphonic noise was added. Also, observe that the waveforms in y(k) (FIG. 5(c)), which depicts the cancelled microphonic noise for the periodic disturbance, are mostly similar to the waveforms without microphonic noise (FIG. 2).

Table 2 summaries the results of these simulations, both for the $^{60}$Co 1.17 MeV and 1.33 MeV energies and for the two disturbances (band-limited white noise and periodic). Note we have set the amplitude of the disturbance such that, for these two energies, the resolution with microphonic noise degrades by the same amount. Then, when we turn on the identification algorithm, the performance for both $^{60}$Co lines improves by the same amount, almost recovering the original energy resolution. Now we estimate the actual energy (i.e., the mean) in the output of the trapezoidal filter to detect if the proposed scheme introduces some bias on the energy itself. We used the two lines for the case without microphonic noise as the "calibration" to estimate the other energies. The results are also summarized in Table 2. Observe that for the 1.17 MeV line the energy did not change with microphonic noise or when it was cancelled.

However, we measured a small fluctuation of 1 KeV for the 1.33 MeV line before microphonic noise cancellation (i.e., 1.329 MeV).

TABLE 2

Results of the simulations of the microphonic noise cancellation

| $^{60}$Co line | | Resolution (FWHM) | | Energy (MeV) | |
|---|---|---|---|---|---|
| | | 1.17 MeV | 1.33 MeV | 1.17 MeV | 1.33 MeV |
| Without microphonic noise d(t) | | 2.37 | 2.37 | 1.170 | 1.330 |
| With microphonic noise s(k) | | 3.35 | 3.35 | 1.170 | 1.329 |
| Cancelled microphonic noise y(k) | White noise disturbance | 2.42 | 2.42 | 1.170 | 1.330 |
| | Periodic disturbance | 2.46 | 2.46 | 1.170 | 1.330 |

Figure 6:
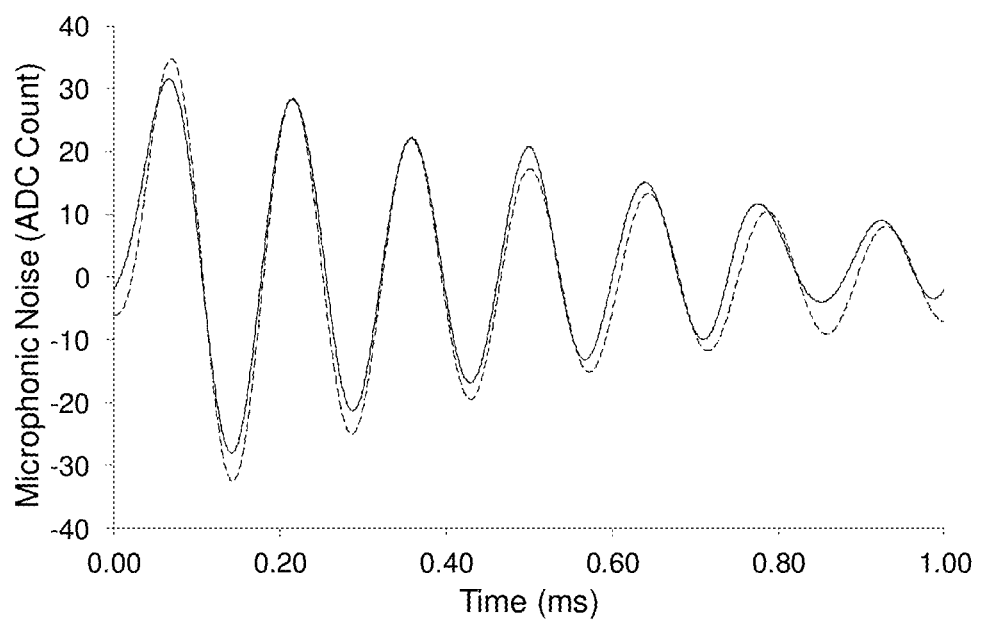
FIG. 6 illustrates original microphonic noise p(k) (continue line) and estimated microphonic noise p̂(k) (dashed line).

FIG. 6 shows the original microphonic noise p(k) (continue line) and its estimation p̂(k) (dashed line) for the case of periodic disturbance. Observe that p(k) and p̂(k) did not have to precisely match to obtain the results described in Table 2. Actually, perfect identification is not possible in this case, since the detector noise n(k) will always generate an error e(q) (Eq. 7), which will then keep the parameters of the adaptive filter Ĥ(q) (Eq. 4) fluctuating around the optimum solution. As we pointed out before, a precise match is not needed, since the remaining microphonic noise (the subtraction of the continue and dashed lines in FIG. 6) is small when compared with the detector noise n(k).

Figure 7:
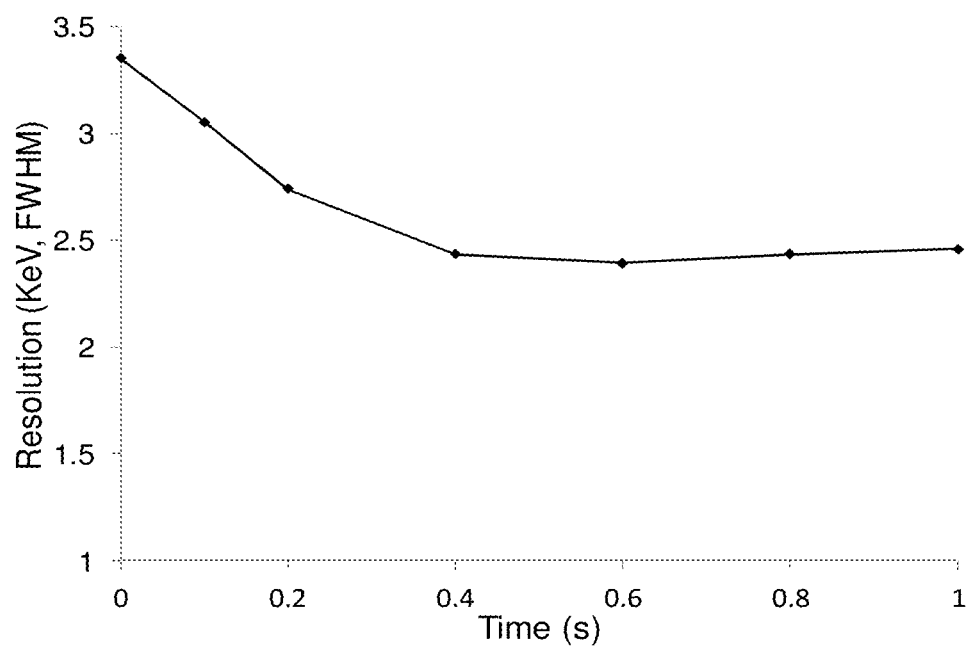
FIG. 7 illustrates an improvement on energy resolution as the adaptive algorithms cancels the microphonics noise.

We have also measured the energy resolution when the adaptive algorithm is still adapting to the disturbance. For this specific simulation we used the periodic disturbance and we measured the resolution at different times during the adaptation process. FIG. 7 shows the results and it should be compared with FIG. 5(a). Observe that, as the contribution of the microphonics noise is being cancelled, we already observe an improvement on the performance of the energy resolution.

Observe that there is no requirement that the mechanical disturbances be periodic or with good period stability (as we have exemplified by the band-limited white noise versus periodic disturbance). However, good harmonic content of the disturbance is associated with the persistent excitation condition necessary for good modeling when algorithms like LMS are used. The good harmonic content exercise all poles and zeros of the transfer function H(t), allowing good modeling. In these simulations, both disturbances have good harmonic content for the transfer function H(t) and they are always present. Therefore, they meet the persistent excitation condition. However, the impact of imprecise modeling in this microphonic noise cancellation scheme can be small. For example, consider that the mechanical system modeled here had another resonant frequency above certain frequency, and that our disturbance was band limited to less than this frequency. The disturbance will not exercise these higher resonance frequencies and, therefore, the adaptive filter algorithm will not model these higher frequency poles and zeros. However, if one vibration mode of the detector structure is not excited because the disturbance is band limited, this one mode will not contribute to the microphonic noise, and therefore, there is no need to cancel it. Therefore, though the model identification is imprecise, the microphonic cancellation scheme proposed here can still yield good results. Also, the LMS algorithm may have to be turned off when there is no mechanical disturbance (i.e., the persistent excitation condition does not hold) to avoid the parameters of the filter drifting away from the optimum solution due to noise in the radiation detector and vibration sensor. Various embodiments describe a scheme that may become a very powerful tool to reduce microphonic noise in future systems.

What is claimed is:

1. A method of reducing microphonic noise comprising:
providing a radiation detector that receives radiation and generates a radiation detector output signal;
providing a sensor coupled to the radiation detector;
measuring a mechanical disturbance utilizing the sensor coupled to the radiation detector, wherein the sensor produces a mechanical disturbance signal;
identifying a system transfer function H(k) of an electro/mechanical system that injects microphonic noise into the radiation detector output signal by utilizing an identification algorithm that further utilizes a digitized mechanical disturbance signal that has been digitized by an analog to digital converter (ADC) and a digitized radiation detector output signal that has been digitized by a second ADC as inputs, wherein the identification algorithm modifies the output of the system transfer function H(k);
applying the digitized mechanical disturbance signal to the system transfer function H(k) to generate a digitized output signal; and
subtracting the digitized output signal from the digitized radiation detector output signal to reduce the microphonic noise.

2. The method of claim 1, wherein the identification algorithm comprises a least means square (LMS) algorithm.

* * * * *